United States Patent
Gee et al.

(10) Patent No.: US 6,429,033 B1
(45) Date of Patent: Aug. 6, 2002

(54) PROCESS FOR MANUFACTURING MIRROR DEVICES USING SEMICONDUCTOR TECHNOLOGY

(75) Inventors: Dale A. Gee, Los Gatos; Abhijeet D. Sathe, Tracy, both of CA (US)

(73) Assignee: Nayna Networks, Inc., Milpitas, CA (US)

(*) Notice: Subject to any disclaimer, the term of this patent is extended or adjusted under 35 U.S.C. 154(b) by 0 days.

(21) Appl. No.: 09/865,851

(22) Filed: May 24, 2001

Related U.S. Application Data

(60) Provisional application No. 60/270,404, filed on Feb. 20, 2001.

(51) Int. Cl.[7] .................................................. H01L 21/00
(52) U.S. Cl. ............................ 438/48; 438/53; 438/149
(58) Field of Search ........................ 438/48, 50, 52–53, 438/39, 41–44, 149

(56) References Cited

U.S. PATENT DOCUMENTS 5,262,000 A * 11/1993 Welbourn et al. ........... 216/101
5,646,768 A * 7/1997 Kaeriyama ................... 359/223

* cited by examiner

Primary Examiner—Jey Tsai
(74) Attorney, Agent, or Firm—Townsend and Townsend and Crew LLP

(57) ABSTRACT

A method for fabricating a mirror array from a silicon on insulator substrate structure. The method includes providing a silicon-on-insulator (SOI) substrate structure, which may have a material thickness of greater than 10 microns overlying an insulating layer. The SOI material thickness is of a single crystal silicon bearing material. The method also patterns the material thickness using a deep reactive ion etching process to pattern a mirror device structure by forming a trench region that extends from a surface of the material thickness to the insulator structure; and patterns the thickness of material to form a recessed region coupled to the trench region to define a torsion bar structure. The recessed region extends from the surface of the material thickness and is less than about 80% of the mirror device thickness. The method forms an opening on a back side of the SOI substrate structure to the insulator structure. The method removes the insulator material to release the mirror device structure and the torsion bar structure.

11 Claims, 11 Drawing Sheets

PROCESS FOR MANUFACTURING MIRROR DEVICES USING SEMICONDUCTOR TECHNOLOGY

This application claims benefit of provisional appln. Ser. No. 06/270,404, filed Feb. 20, 2001.

BACKGROUND OF THE INVENTION

This invention generally relates to techniques for fabricating an object. More particularly, the present invention provides a method for fabricating a switch fabric using one or more semiconductor processing techniques. Merely by way of example, the present invention is implemented using such method for a fabric in a wide area network for long haul telecommunications, but it would be recognized that the invention has a much broader range of applicability. The invention can be applied to other types of networks including local area networks, enterprise networks, small switch designs (e.g., two by two or greater) and the like.

As a need for additional switching channels increases, it becomes more desirable to have larger and larger switching devices. Such switching devices must often be capable of switching a beam from one optical fiber to one of a plurality of optical fibers, which can include hundreds of such fibers. Integration of such optical fibers and switching a single beam from one fiber to another fiber is often a difficult task by way of a purely optical technique. Accordingly, there have been many attempts to make commercial devices that require the need to convert optical signals from a first source into electric signals for switching such optical signals over a communication network. Once the electric signals have been switched, they are converted back into optical signals for transmission over the network.

Numerous limitations exist with such conventional electrical switching technique. For example, such electrical switching often requires a lot of complex electronic devices, which make the device difficult to scale. Additionally, such electronic devices become prone to failure, thereby influencing reliability of the network. The switch is also slow and is only as fast as the electrical devices. Accordingly, techniques for switching optical signals using a purely optical technology have been proposed. Such technology can use a wave-guide approach for switching optical signals. Unfortunately, such technology has been difficult to scale and to build commercial devices. Other companies have also been attempting to develop technologies for switching high number of signals in other ways, but have been generally limited.

For example, Petersen forms a two-dimensional mirror structure with relatively large design dimensions. We understood that the design dimensions of Petersen were much greater than what is required for high-density integrated designs of hundreds of devices and greater. Additionally, Petersen has been effective in forming one or more mirror devices from a substrate fabric. Such devices often cannot be scaled up to form large arrays of such mirror devices. Petersen also has limitations in that the deflection devices warp with optical coatings. Additionally, such devices had poor frequency response and operation characteristics. A way of controlling device thickness and torsion bar thickness also posed a problem. These and other limitations are described throughout this specification and more particularly below.

From the above, it is seen that an improved way to fabricate deflection devices is highly desirable.

SUMMARY OF THE INVENTION

According to the present invention, a technique including a method for fabricating an object such as a switch fabric is provided. More particularly, the invention provides a method using one or more semiconductor processing techniques. Merely by way of example, the present invention is implemented using such method for a fabric in a wide area network for long haul telecommunications, but it would be recognized that the invention has a much broader range of applicability. The invention can be applied to other types of networks including local area networks, enterprise networks, small switch designs (e.g., two by two or greater) and the like.

In a specific embodiment, the invention provides a method for fabricating a mirror array from a silicon on insulator substrate structure. The method includes providing a silicon-on-insulator (SOI) substrate structure, which may have a material thickness of greater than 10 microns overlying an insulating layer, although the substrate structure can be made of other materials. The SOI material thickness is of a single crystal silicon bearing material. The method also patterns the material thickness using a deep reactive ion etching process to pattern a mirror device structure by forming a trench region that extends from a surface of the material thickness to the insulator structure; and patterns the thickness of material to form a recessed region coupled to the trench region to define a torsion bar structure. The recessed region extends from the surface of the material thickness toward the insulator structure and has a depth that is more than about 20% of the mirror device thickness in a preferred embodiment. The method forms an opening on a back side of the SOI substrate structure to the insulator structure. The method removes the insulator material to release the mirror device structure and the torsion bar structure.

Many benefits are achieved by way of the present invention over conventional techniques. The invention provides an easy and efficient way of manufacturing high density mirror arrays, e.g., 500 sites, 550 sites, 1000 sites, 4000 sites, and greater. The present invention also can use conventional process technology, which makes it efficient to make and use it. By way of the silicon on insulator substrate, the invention provides an etch stop using the insulator layer sandwiched between semiconductor layers. In some embodiments, the invention uses epitaxial silicon as a mirror layer, which is high quality single crystal silicon. In most embodiments, the present method is efficient. Depending upon the embodiment, one or more of these benefits may be achieved.

Various additional objects, features and advantages of the present invention can be more fully appreciated with reference to the detailed description and accompanying drawings that follow.

DESCRIPTION OF THE SPECIFIC EMBODIMENTS

According to the present invention, a technique including a method for fabricating an object is provided. More particularly, the invention provides a method using one or more semiconductor processing techniques for an improved process. Merely by way of example, the present invention is implemented using such processing techniques for fabrication of a switch fabric for a wide area network for long haul telecommunications, but it would be recognized that the invention has a much broader range of applicability. The invention can be applied to other types of networks including local area networks, enterprise networks, smaller switch fabrics (e.g., two by two) and the like. Details of the present method are provided throughout the present specification and more particularly below.

Figure 1:
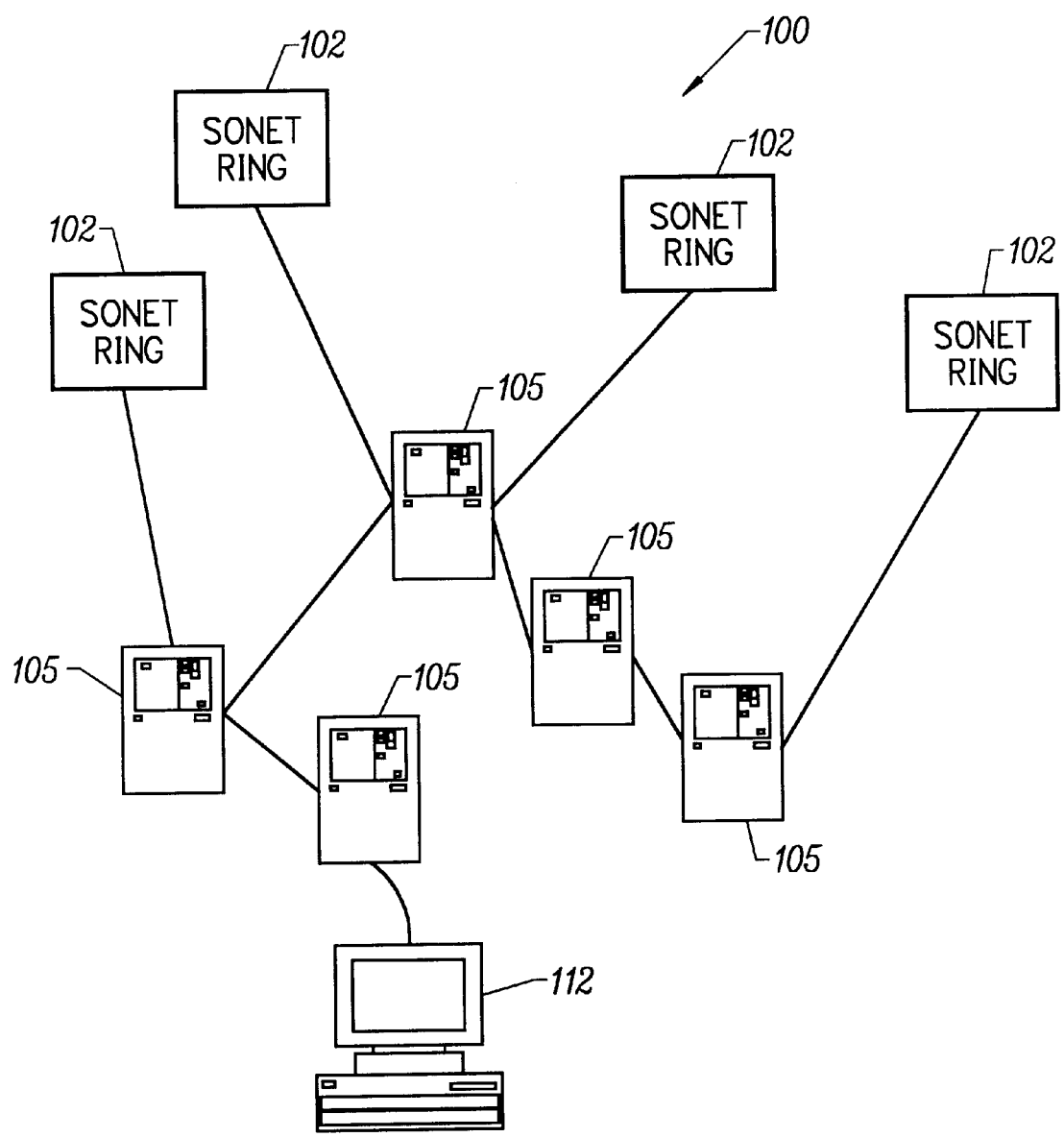
FIG. 1 is simplified diagram of an optical switching device according to an embodiment of the present invention.

FIG. 1 is a simplified diagram of an optical switching device 100 according to an embodiment of the present invention. This diagram is merely an example, which should not unduly limit the scope of the claims herein. One of ordinary skill in the art would recognize many other variations, modifications, and alternatives. As shown, the device 100 for switching one of a plurality of optical signals from a plurality of optical fibers 101 is provided. The device has an input fiber bundle housing 103 comprising an outer side 105 and an inner side 106. The input fiber bundle housing has a plurality of sites 107 oriented in a spatial manner on the outer side for coupling to a plurality of input optical fibers. Each of the input optical fibers is capable of transmitting an optical signal. Preferably, the signal is transmitted through a lens, which is described in more detail below. The apparatus also has a first mirror array 109 disposed facing the inner side of the input fiber bundle housing. The first mirror array 109 includes a plurality of mirrors 111. Each of the mirrors 111 corresponds to one 113 of the sites on the outer side of the input fiber bundle housing. A second mirror array 115 is disposed facing the first mirror array. The second mirror array is also disposed around a periphery 116 of the input fiber bundle housing. The second mirror array also has a plurality of mirrors 117, where each of the mirrors is capable of directing at least one signal from one of the mirrors on the first mirror array. The device has an output fiber bundle housing 119 comprising an outer side 121 and an inner side 123. The output fiber bundle housing has a plurality of sites 125 oriented in a spatial manner on the outer side for coupling to a plurality of output optical fibers. Each of the sites is capable of receiving at least one signal from one of the second mirrors.

The housing is made of a suitable material that is sufficiently rigid to provide a structural support. Additionally, each housing also has sufficient characteristics to house a fiber optic member. Furthermore, the material also has the ability to provide an array of fiber optic sites, which house fiber optic members. The material can include a conductor, an insulator, or a semiconductor, or any combination of these, as well as multi-layered structures. The housing is preferably made of a similar material as the mirror array to cancel out any thermal expansion/contraction influences. Preferably, the material is silicon, but can also be other materials. Desirable, the material is also easy to machine and resists environmental influences. The housing also is capable of coupling to a lens and/or lens array, which will be described in more detail below.

Although the above has been described in terms of where the output arrays are split into a plurality of smaller arrays, the input arrays can also be split into a plurality of smaller arrays. Here, the output array would be a single piece larger array. Alternatively, each of the arrays can be split into a plurality of smaller sections or arrays. Each of these arrays can be of a similar size or a different size, depending upon the embodiment. The arrays can also be in a variety of shapes such as annular, trapezoidal, a combination of these, and others. These and other configurations would be recognized by one of ordinary skill in the art, where there can be many variations, modifications, and alternatives.

Figure 2:
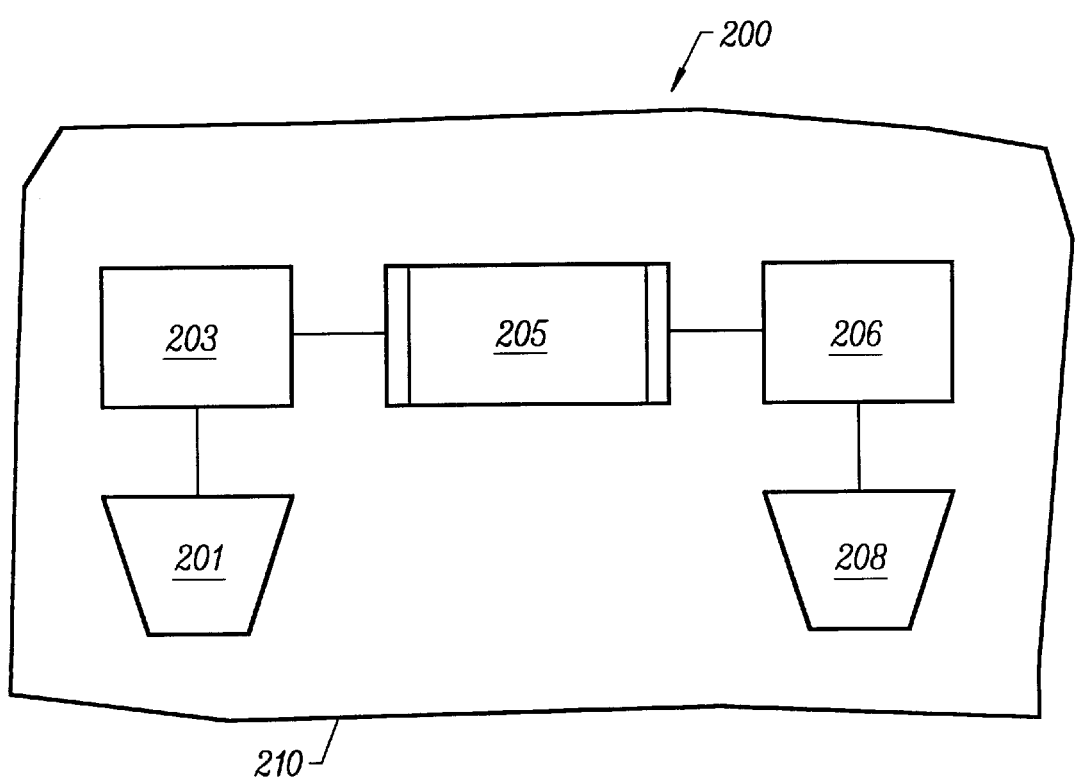
FIG. 2 is a simplified diagram of an optical deflection device according to an embodiment of the present invention.

FIG. 2 is a simplified diagram of an optical deflection device 200 according to an embodiment of the present invention. This diagram is merely an example, which should not unduly limit the scope of the claims herein. One of ordinary skill in the art would recognize many other variations, modifications, and alternatives. Like reference numerals are used in this FIG. as some of the others, but are not intended to be limiting. As shown, the mirror array 210 couples to substrate 201, which was previously detached from the mirror array. The mirror array can be one of the above, as well as others, which are driven by electrode devices. The mirror array and substrate couple to each other through bonding layer 203. The substrate is often a silicon substrate, which can be made using a semiconductor fabrication process or processes. The silicon substrate can include a variety of electrical circuits for driving electrodes 206, which move each one of the mirrors 202 on the mirror array.

As shown, the silicon substrate has a plurality of electrode groups 206 an upper surface portion of the substrate. A dielectric layer underlies the electrode groups. Each of the electrodes couples to lines, which couple to drive circuitry. The dielectric layer can be any suitable material such as silicon dioxide, aluminum dioxide, silicon nitride, doped silicon glass, spin-on-glass, and the like. The dielectric layer can be a single layer or multiple layers. The electrodes groups are made of a suitable conductive material, such as aluminum, copper, aluminum alloys, and the like. The material can also be titanium, tungsten, or other barrier type material. The electrodes can also be any combination of these, as well as others. In some embodiments, a dielectric layer or insulating layer can be formed overlying the electrodes. The dielectric layer can be used to protect the electrodes. The dielectric layer can be can be any suitable material such as silicon dioxide, silicon nitride, doped silicon glass, spin-on-glass, and the like. The dielectric layer can be a single layer or multiple layers. The dielectric layer, however, is thin enough to allow the electrodes to influence movement of the mirrors on the array.

The substrate includes at least first and second metal layers. A third metal layer can also be included. The second metal layer can be used for the electrodes 206, as noted above. The first metal layer can be used for integrated circuit elements including drive circuitry, sense electrodes for the mirror, which are able to pick up the very low capacitance values without suffering the noise from the interconnects. The substrate can be made using technology of NMOS, CMOS, bipolar, or any combination of these. In an embodiment using CMOS circuitry, the substrates includes sense and drive electrodes, multiplexing circuitry (MUX) to multiplex signals from interconnects from the mirror electrodes to reduce the number of connections to the outside world, e.g., wire bonds. The substrate also has drive hold circuitry (and associated control circuitry) to reduce the overhead necessary to maintain mirror position.

In a specific embodiment, the bonding layer can be any suitable material or materials to connect the mirror array to the substrate. The bonding layer can be a plurality of bumps 204. In one embodiment, the plurality of bumps can be made using an IBM C4 process from flip chip technology, i.e., IBM C4 process—Controlled Collapse Chip Connection (i.e., Flip-Chip Attach (FCA), whereby the chip to be bonded is pre-treated with a solder "bump" on each of the bond pads and flipped over and aligned with the underlying substrate for re-flow). This allows for high-density (100s to 1000s of interconnects) in a relatively small area. The integrated array and substrate are packaged in a carrier. Alternatively, the bonding layer can be made using a deposition process, a screen printing process, an ink jet printing process, a photolithography process, a eutectic bonding layer, a plated bonding layer, any combination of these and the like. In a specific embodiment, the carrier can be made of a ceramic material. Alternatively, it could be a plastic material. Bonding wires connect each bonding pad 501 to the interconnect. As shown, the bonding pads are formed on the substrate along a periphery of the mirror array. In a specific embodiment, the bonding pads are provided on the same metal layer as the electrodes. Alternatively, the bonding pads can also be provided on a different metal layer. Of course, the specific configuration can depend highly upon the embodiment. Details of the present device according to the present invention are provided below.

Figure 2A:
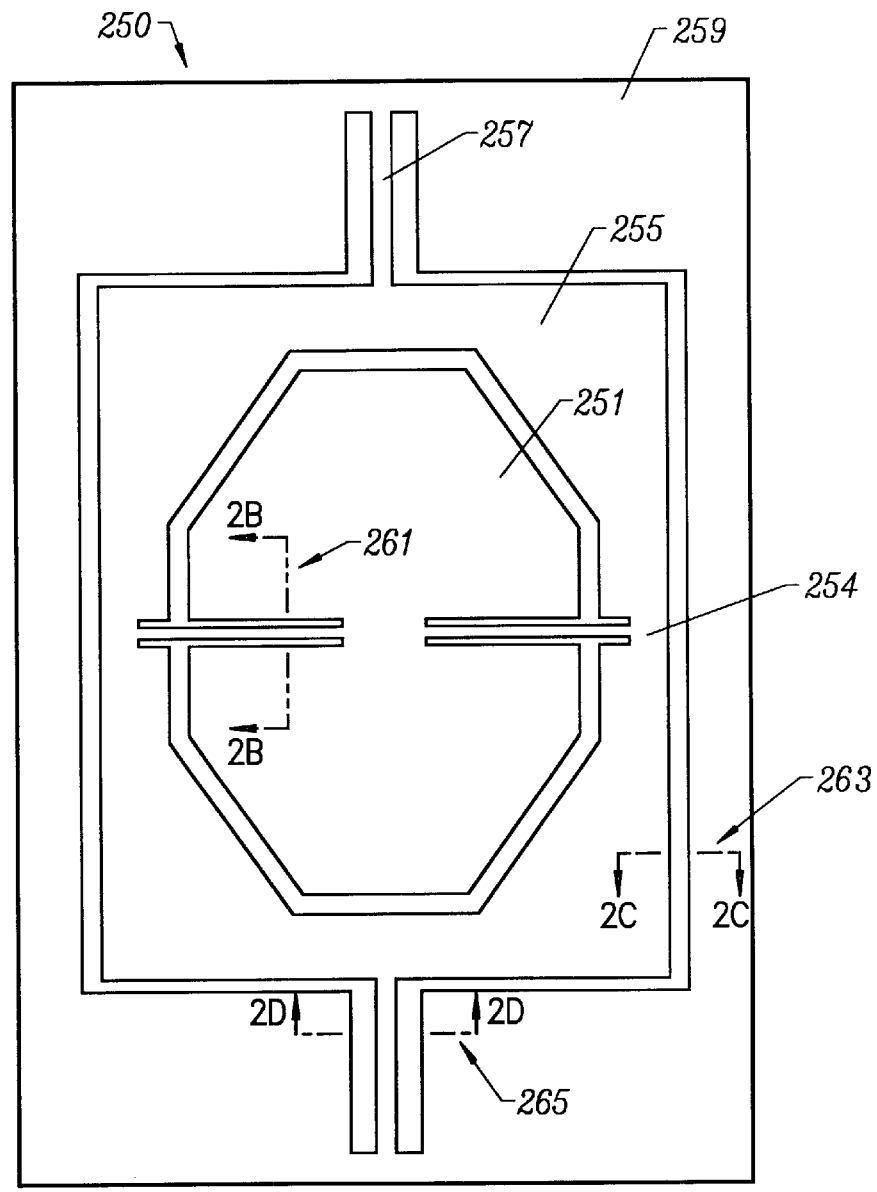
FIGS. 2A, 2B, 2C, and 2D are more detailed diagrams of an optical deflection device according to an embodiment of the present invention.

FIG. 2A is a simplified top view diagram of a switching device 250 according to an embodiment of the present invention. This diagram is merely an example that should not unduly limit the scope of the present invention as defined by the claims. One of ordinary skill in the art would recognize many other variations, alternatives, and modifications. As shown, the switching device 250 includes a variety of features such as a deflection device 251. The deflection device 251 is operably coupled in a first direction to a support structure 254 through a plurality of torsion bars 253. The deflection device is also operably coupled in a second direction through torsion bars 253 coupled to support structure and through a plurality of torsion bars 257 to support member 259. The first direction is perpendicular to the second direction. As shown, the two pairs of torsion bars provide movement of the deflection device in a three dimensional manner. Such dimensions include movement of the deflection device about each of the directions including the first direction and the second direction. The top view diagram of the device also illustrates the three reference points. The first reference point is defined by a reference numeral 261. The second reference point is defined by reference numeral 263. The third reference point is defined by reference numeral 265. Details of the device using cross-sectional view diagrams are provided below.

Figure 2B:
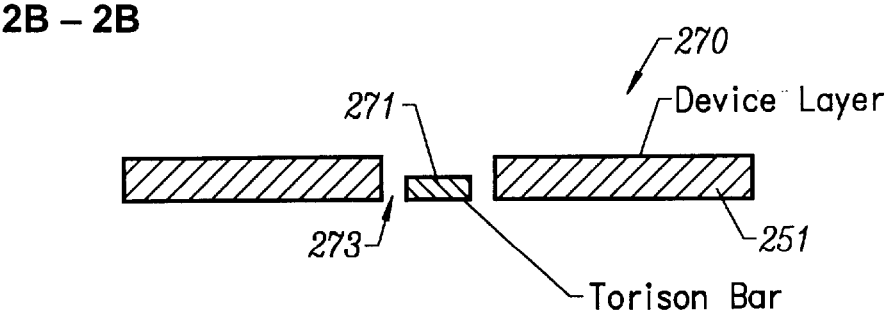

FIG. 2B is a simplified cross sectional view of the deflection device about reference numeral 261, as previously noted. This diagram is merely an example that should not unduly limit the scope of the present invention as defined by the claims. One of ordinary skill in the art would recognize many other variations, alternatives, and modifications. As shown, the cross sectional view diagram of the deflection device includes the deflection device to 251. The cross sectional view diagram and also includes a torsion bar 271. A gap or spacing is defined between the torsion bar 271 and the deflection device 251.

Figure 2C:
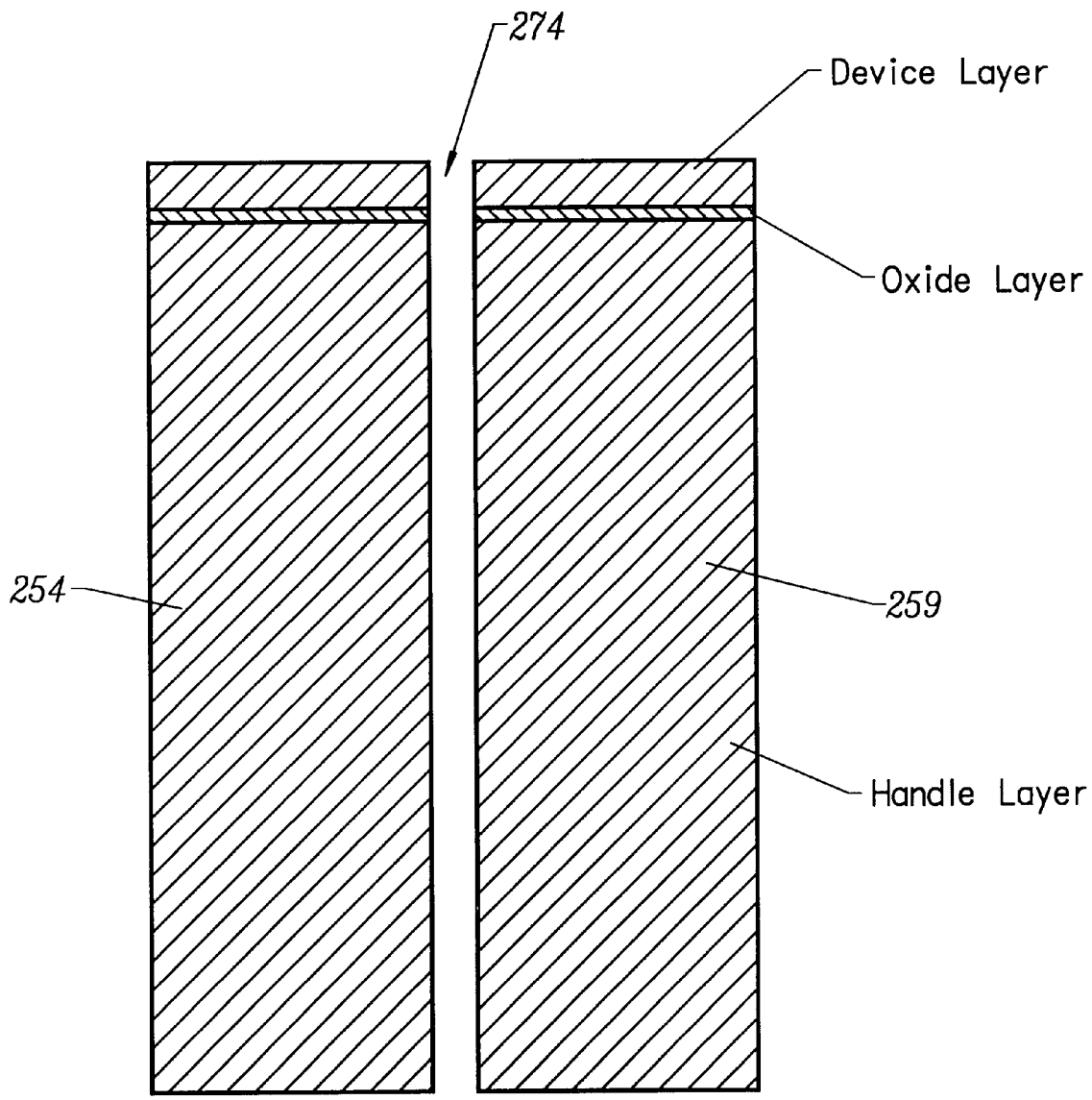

FIG. 2C is a simplified cross sectional view diagram of the deflection device about reference numeral 263, as previously noted. This diagram is merely an example that should not unduly limit the scope of the present invention as defined by the claims. One of ordinary skill in the art would recognize many other variations, alternatives, and modifications. As shown, the cross sectional view diagram of the region defined by reference numeral 263 shows a gap 274 or spacing the define between support structure 254 and support structure 259. The support structure 254 is operably coupled to support structure 259 by way of torsion bars 257, described above. Each of the support structures is defined on a device layer that overlies an insulating layer defined on a handle substrate.

Figure 2D:
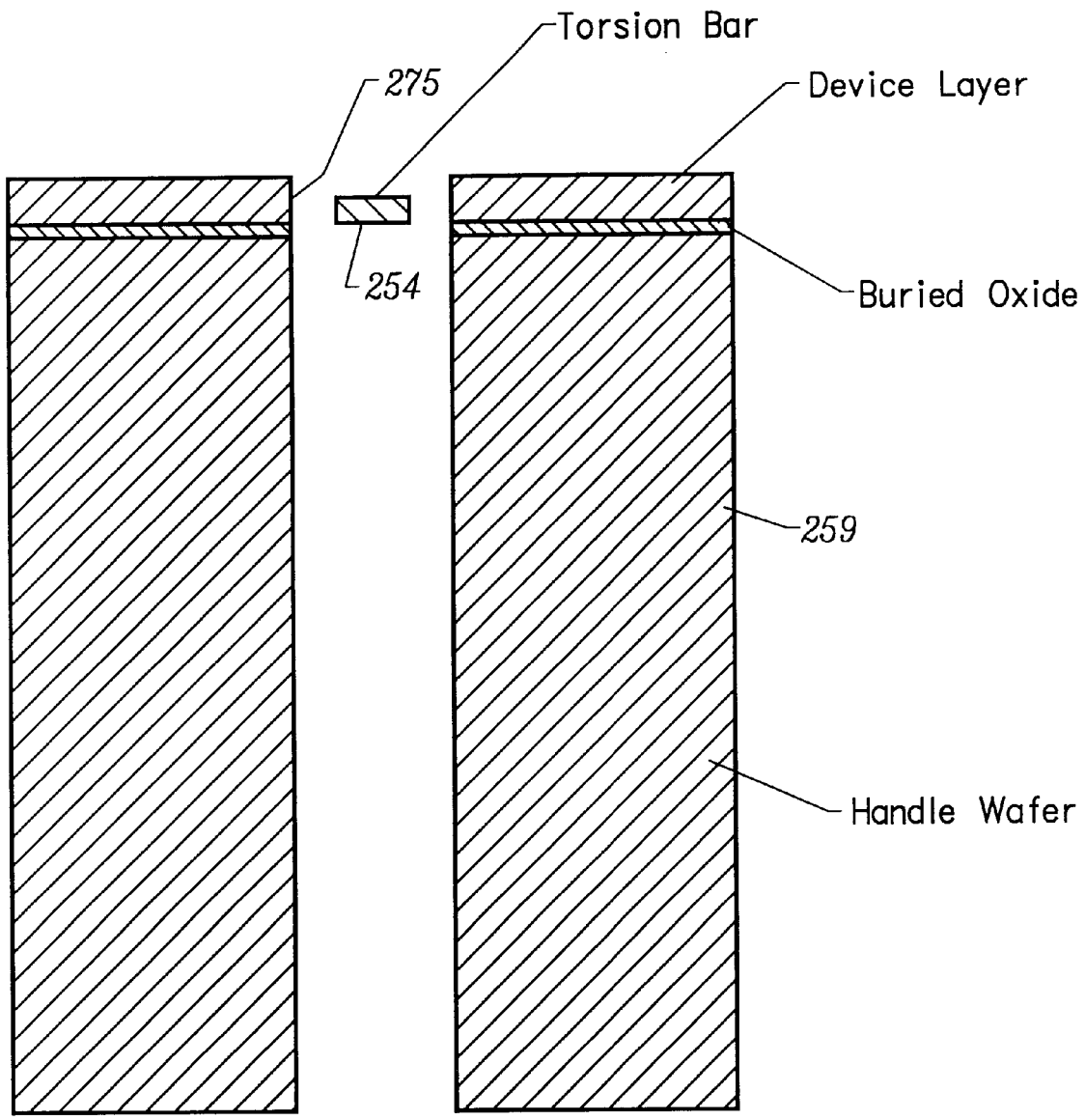
Figure 3:
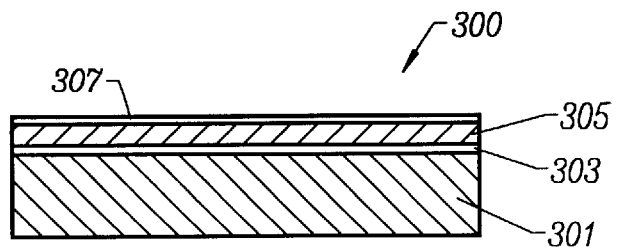
FIGS. 3–12 are simplified diagrams illustrating methods for fabricating an optical deflection device according to embodiments of the present invention.

FIG. 2D is a simplified cross sectional view diagram of a deflection of device about reference numeral 265. This diagram is merely an example that should not unduly limit the scope of the present invention as defined by the claims. One of ordinary skill in the art would recognize many other variations, and alternatives, and modifications. As shown, the cross sectional view diagram of the region defined by reference numeral 265 shows a torsion bar 254 position and between support structure 259. A gap or spacing 275 is defined between the torsion bar 254 and the support structure 259. Details of a fabrication process according to an embodiment of the present invention are described throughout the present specification and more particularly below.

A method for fabricating a switching device is shown as follows:

1. Provide silicon on insulator silicon substrate (optionally, the silicon is epitaxial silicon);
2. Grind and polish backside of substrate to thin substrate;
3. Form silicon dioxide (e.g., 3000 Angstroms) overlying topside and bottom side of substrate to form protective layer;
4. Form contact mask overlying top side of protective layer to define contacts;
5. Etch (e.g., wet dip) to form openings for contacts through protective layer;
6. Remove contact mask;
7. Deposit conductive layer (e.g., aluminum) for contacts overlying silicon through exposed portions of the protective layer;
8. Pattern conductive layer to form contacts on conductive layer;
9. Form first mask layer on silicon dioxide to define mirror structure;
10. Define mirror structure on silicon dioxide to expose substrate portions;
11. Strip first mask layer;
12. Form oversized mask (second mask layer) relative to exposed substrate portions;
13. Etch exposed substrate portions to define regions that will be completely removed;
14. Selectively remove exposed silicon dioxide;
15. Perform torsion bar etch to continue etching the exposed substrate portions to define mirror to the insulator and define torsion bar, which is relatively thinner than the mirror;
16. Strip oversized mask;
17. Pattern backside of substrates to define backside of mirror;
18. Etch backside of substrate with pattern up to insulator, which acts as an etch stop layer;
19. Perform selective etch (e.g., deep RIE, wet etch) on insulator of the patterned backside to release mirror from the insulator;
20. Form coating on surfaces of mirror (preferably, the coatings cover substantially all exposed surfaces of the mirror); and
21. Perform other steps as desirable.

The above steps provide an improved way of forming mirror array structures coupled to torsion bars. The steps provide a method that does not require a difficult to form masking layer. Rather, the method relies upon at least a combination of oversized mask and related mask to form a torsion bar structure that is much thinner than the thickness of the mirror structure. The thinner torsion bar structure can be driven at a much lower voltage and provides easy operation using conventional drive circuitry. In an alternative embodiment, the steps provide a method that can be easy to perform using conventional semiconductor technology. The technology can be used to form highly integrated mirror array structures, where the structures can have a minimum design dimension of microns and less. These and other benefits and details of the present method are provided throughout the present specification and more particularly by way of the Figs. below.

FIGS. 3–12 are simplified diagrams illustrating methods for fabricating an optical deflection device according to embodiments of the present invention. These diagrams are merely examples, which should not unduly limit the scope of the claims herein. One of ordinary skill in the art would recognize many other variations, modifications, and alternatives. As shown, the method begins by providing a semiconductor substrate 300, which is a silicon bearing material 305 overlying an insulating material 303, which overlies a silicon bearing material. Silicon bearing material 305 is often single crystal silicon, which may have an overlying layer of epitaxial silicon or epitaxial quality silicon. The substrate can be made using a silicon layer of about 10–20 microns overlying on insulator (e.g., 3,000 to 10,000 Angstroms), which is formed on the silicon substrate (e.g., 525 to 650 microns), but can be made using other dimensions as well. The surface of the substrate has a uniformity that is better than one percent or better than 0.5 percent. In a specific embodiment, the substrate is thinned from the backside. Here, the substrate is subjected to a grinding and polishing process from the backside to thin the substrate to about 200 microns, for example, but can be at other dimensions, as well.

Overlying the silicon layer is an insulating layer 307. The insulating layer is often formed using silicon dioxide. The silicon dioxide can be made using a suitable process such as thermal oxidation, wet oxidation, any combination of these and the like. In a specific embodiment, the method forms silicon dioxide overlying topside and bottom sides of substrate to form a protective layer, which can be defined as a mask. The protective layer of silicon dioxide can be about 3000 Angstroms, but is not limited. Further details of the process are provided below.

Figure 4:
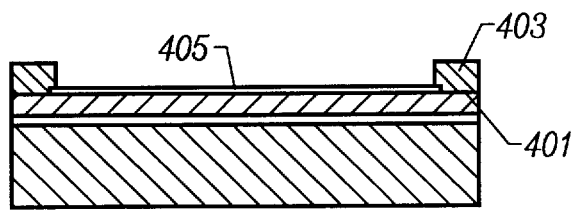

In a specific embodiment, the method forms contacts for electrical connections to the substrate. These contacts are used to drive and/or sense signals to and from the mirror device. The method for forming contacts uses conventional masking and etching processes. Here, a contact mask is formed overlying the top side of protective layer to define contacts openings. The substrate is etched to form openings for contacts through protective layer. In a specific embodiment, the method uses a selective etching process such as wet etching using a hydrofluoric acid bearing solution or dry plasma etching. Next, the contact mask is removed, which exposes contact regions on the substrate. The method deposits a conductive layer (e.g., aluminum) for contacts overlying exposed regions of silicon through exposed portions of the protective layer. The conductive layer is patterned to form contacts. A contact structure is shown in FIG. 4, for example. As shown, the substrate includes contact regions 401 in the substrate and overlying contact layer 403. The protective layer, which has openings, still remains on the top surface of the substrate.

Figure 5:
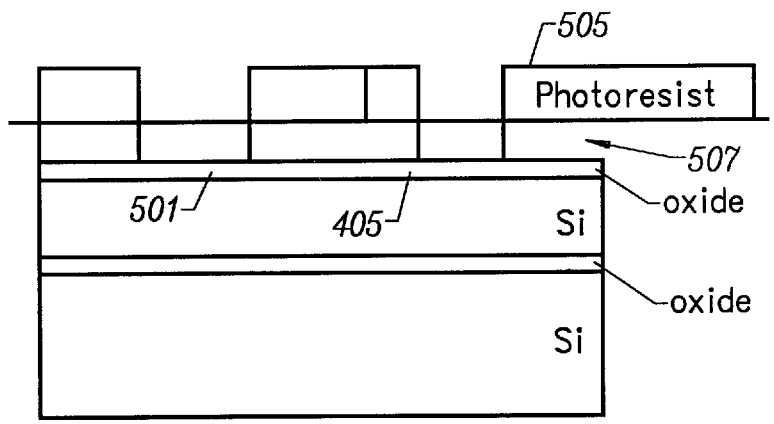
Figure 6:
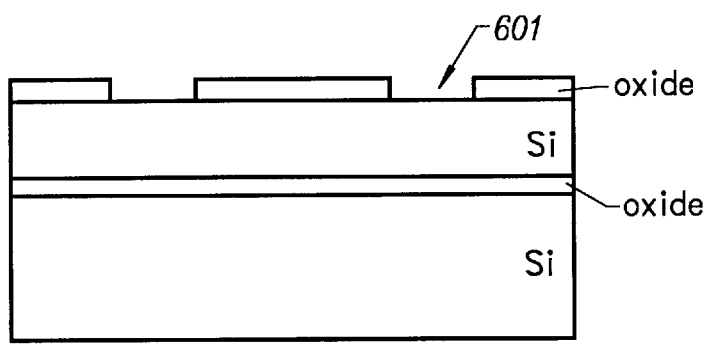
Figure 7:
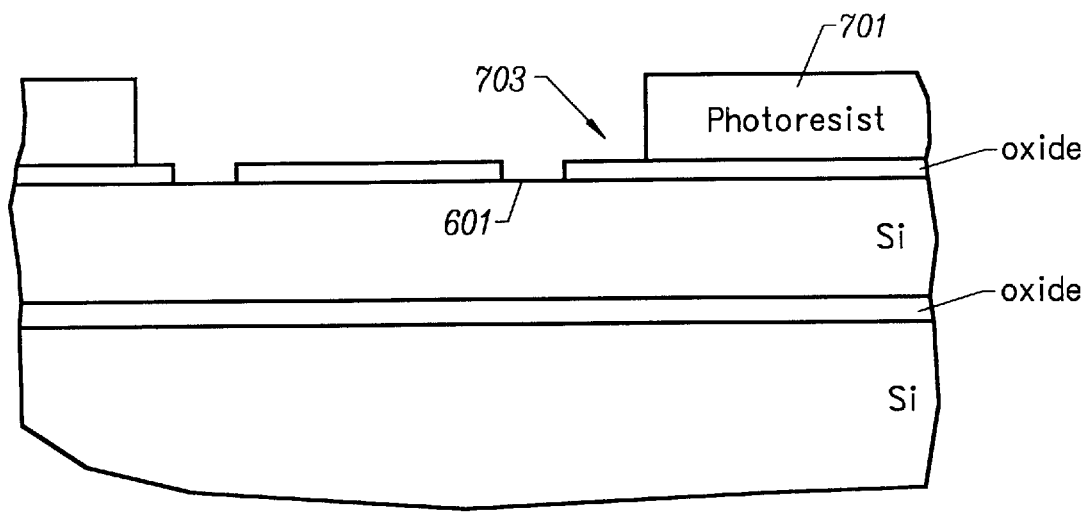

In a specific embodiment, the method then patterns the silicon layer overlying the insulator to define mirror devices and torsion bars, as well as other elements. The method forms a first mask layer 507 on silicon dioxide to define a mirror structure, as shown in FIG. 5. The method uses conventional masking and etching processes to form openings 503 in the masking layer overlying the protective layer. The openings define regions for the mirror device and torsion bar. Here, the mirror device underlies photomask at reference numeral 507. The method defines a torsion bar by a region 501 occupied under another portion of the photomask. An etching step is used to expose the silicon material 601, where the protective layer remains to serve as a mask, as shown by the simplified diagram of FIG. 6. The diagram also shows that the photoresist has been stripped.

Figure 8:
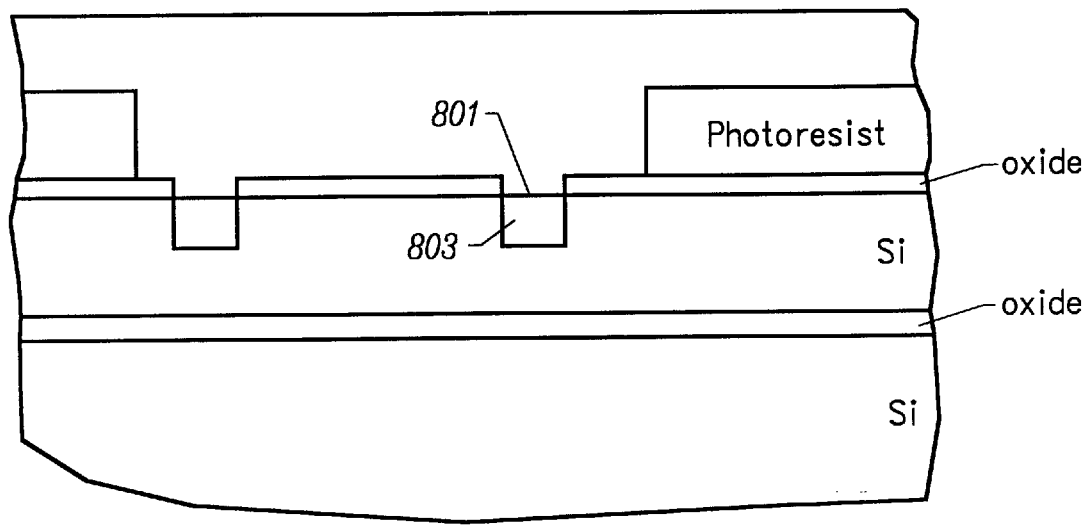

The method then forms an oversized mask (second mask layer) 701 relative to exposed substrate portions 601. The oversized mask exposes a portion 703 of the protective layer, which still serves as a mask. The surface of the substrate is etched to form trench region 803 and torsion bar region 801, as shown in FIG. 8. The etching process can use any suitable chemistry for removing the silicon on the substrate. Here, etching can be performed using a wet etching process and/or dry etching process. Preferably, the etching process uses a fluorine bearing species.

Figure 9:
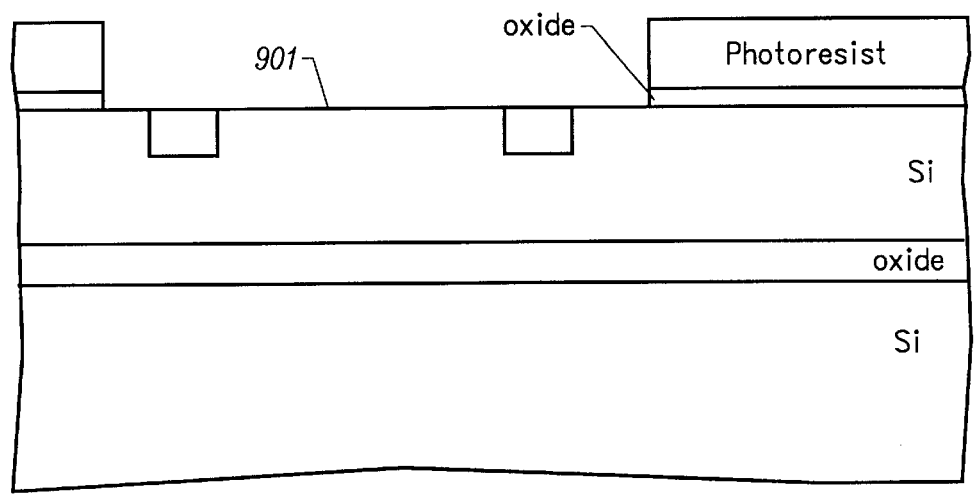
Figure 10:
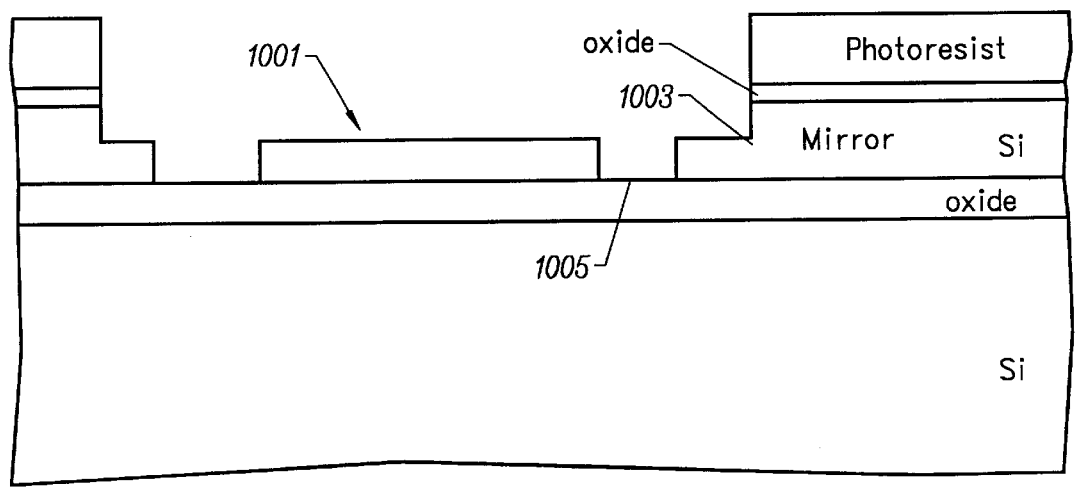

The method then removes 901 the protective layer to exposes the silicon material of the substrate, as shown in FIG. 9. The surface of the substrate is etched in a blanket manner across the entire exposed surface, including trenches, of the substrate. The etching process defines a step like feature 1003 adjacent to the photomask. The method defines region 1001, which will be the torsion bar. The torsion bar region is at a first level. The method also completely removes silicon material all the way down to the insulating material to define each of the mirror structures. The etching process defines both the mirror device and the torsion bar structure.

Figure 11:
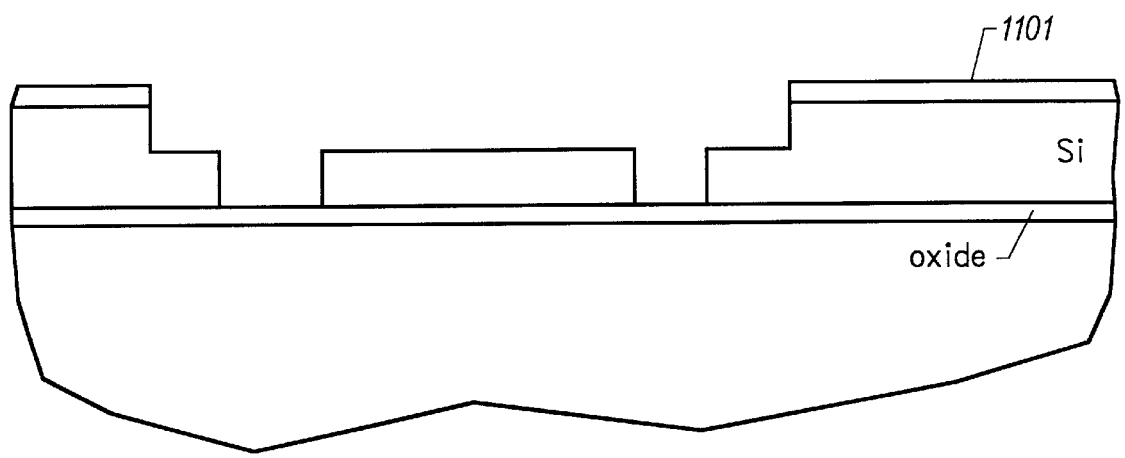
Figure 12:
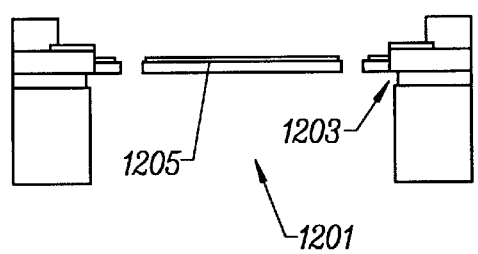
Figure 13:
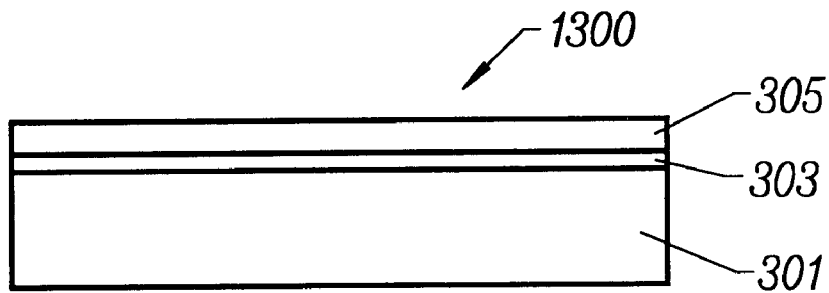
FIGS. 13–18 are simplified diagrams illustrating methods for fabricating an optical deflection device according to alternative embodiments of the present invention.

Next, the photomask is stripped, as shown by FIG. 11. The stripping process exposes the protective layer 1101, which overlies the mirror surface. The method then patterns the backside of the substrate to define the mirror from the backside. An etching step is performed to remove silicon material from the backside of the substrate. An opening 2101 is provided on the backside to remove the silicon substrate material, as shown in FIG. 12. Preferably, the method uses an etching process such as deep reactive ion etching or the like to remove the substrate material from the backside. Preferably, the insulating material acts as an etch stop for the deep reactive ion etching process. Next, the method performs a selective etching process to remove insulating material 1203, which is still adhering to the backside of the mirror device and torsion bars. The selective etching process often uses a wet etching chemical such as a fluorine bearing species but can also be a dry etching process, e.g., plasma etching.

The method then coats 1205 the surfaces of the mirror device to form desirable optical properties. For example, the method can sputter a material such as gold, a gold alloy, chrome, a titanium alloy, or the like onto surfaces of the substrate. In a specific embodiment, the method includes forming a reflective surface on the backside of the mirror device and further includes forming a reflective surface on a front side of the mirror device to balance mechanical stress between the front side and the backside to reduce a possibility of warp age on surfaces of the mirror device. Depending upon the embodiment, the method can also perform other steps, which are before, after, or in between any of the steps described above. Alternatively, the method can remove some of the steps above, as well as combine them to make them more integrated. Additionally, some of the steps can be expanded. It is also understood that the examples and embodiments described herein are for illustrative purposes only and that various modifications or changes in light thereof will be suggested to persons skilled in the art and are to be included within the spirit and purview of this application and scope of the appended claims.

A method for fabricating a switching device according to an alternative embodiment is shown as follows:

1. Provide silicon on insulator silicon substrate;
2. Grind and polish backside of substrate to thin substrate;
3. Form silicon dioxide (e.g., 3000 Angstroms) overlying topside and bottom side of substrate to form protective layer;
4. Form contact mask overlying top side of protective layer to define contacts;
5. Etch (e.g., wet dip) to form openings for contacts through protective layer;
6. Remove contact mask;
7. Deposit conductive layer (e.g., aluminum) for contacts overlying silicon through exposed portions of the protective layer;
8. Pattern conductive layer to form contacts on conductive layer;
9. Form first mask layer on silicon dioxide to define mirror structure;
10. Define mirror structure on silicon dioxide to expose substrate portions and underlying insulating layer;
11. Strip first mask layer;
12. Form second mask layer relative to exposed substrate portions to define a thinner region relative to the mirror structure for at least torsion bars;
13. Etch exposed substrate portions to define regions for torsion bars such that the defined regions do not extend all the way to the insulating layer;
14. Strip second mask layer;
15. Pattern backside of substrates to define backside of mirror;
16. Perform etch (e.g., deep RIE) on patterned backside to release mirror;
17. Form coating on surfaces of mirror; and
18. Perform other steps as desirable.

The above steps provide an improved way of forming mirror array structures coupled to torsion bars. The steps provide a general method for fabricating a mirror array for high integration. The steps provide a method that can be easy to perform using conventional semiconductor technology. In a specific embodiment, the technology can be used to form highly integrated mirror array structures, where the structures can have a minimum design dimension of microns and less. These and other benefits and details of the present method are provided throughout the present specification and more particularly by way of the Figs. below.

FIGS. 13–18 are simplified diagrams illustrating methods for fabricating an optical deflection device according to alternative embodiments of the present invention. These diagrams are merely examples, which should not unduly limit the scope of the claims herein. One of ordinary skill in the art would recognize many other variations, modifications, and alternatives. Like reference numerals are used in these Figs. as some of the others. Such numerals are not intended to be limiting in any manner but are shown for illustrative purposes. As shown, the method begins by providing a semiconductor substrate 1300, which is a silicon bearing material 305 overlying an insulating material 303, which overlies a silicon bearing material. Silicon bearing material 305 is often single crystal silicon, which may have an overlying layer of epitaxial silicon or epitaxial quality silicon. The substrate can be made using a silicon layer of about 10–20 microns overlying on insulator (e.g., 3,000 to 10,000 Angstroms), which is formed on the silicon substrate (e.g., 525 to 650 microns), but can be made using other dimensions as well. In a specific embodiment, the substrate is thinned from the backside. Here, the substrate is subjected to a grinding and polishing process from the backside to thin the substrate to about 200 microns, for example, but can be at other dimensions, as well.

In a specific embodiment, overlying the silicon layer is an insulating layer (not shown). The insulating layer is often formed using silicon dioxide. The silicon dioxide can be made using a suitable process such as thermal oxidation, wet oxidation, any combination of these and the like. In a specific embodiment, the method forms silicon dioxide overlying topside and bottom sides of substrate to form a protective layer, which can be defined as a mask. The protective layer of silicon dioxide can be about 3000 Angstroms, but is not limited. Further details of the process are provided below.

Figure 14:
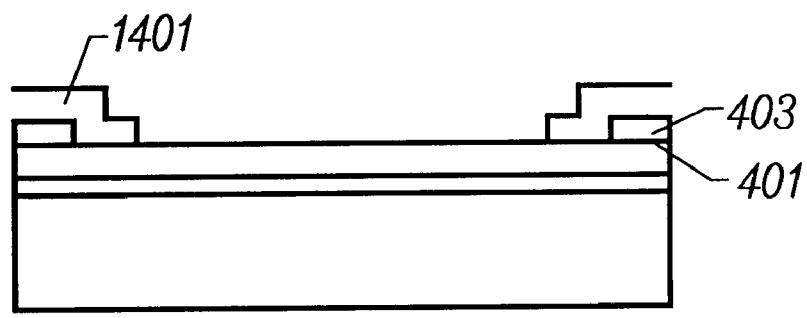

In a specific embodiment, the method forms contacts for electrical connections to the substrate, as shown in FIG. 14. These contacts are used to drive and/or sense signals to and from the mirror device. The method for forming contacts uses conventional masking and etching processes. Here, a contact mask is formed overlying the top side of protective layer to define contacts openings. The substrate is etched to form openings for contacts through protective layer. In a specific embodiment, the method uses a selective etching process such as wet etching using a hydrofluoric acid bearing solution or dry plasma etching. Next, the contact mask is removed, which exposes contact regions on the substrate. The method deposits a conductive layer (e.g., aluminum) for contacts overlying exposed regions of silicon through exposed portions of the protective layer. The conductive layer is patterned to form contacts. As shown, the substrate includes contact regions 401 in the substrate and overlying contact layer 403. The protective layer, which has openings, may still remain on the top surface of the substrate. Overlying the contact layer is insulating layer 1401, which is patterned. The insulating layer can be made of a suitable material such as silicon dioxide, doped silicon dioxide, silicon nitride, and the like. The layer can also be multiple layers and other combinations of layers.

Figure 15:
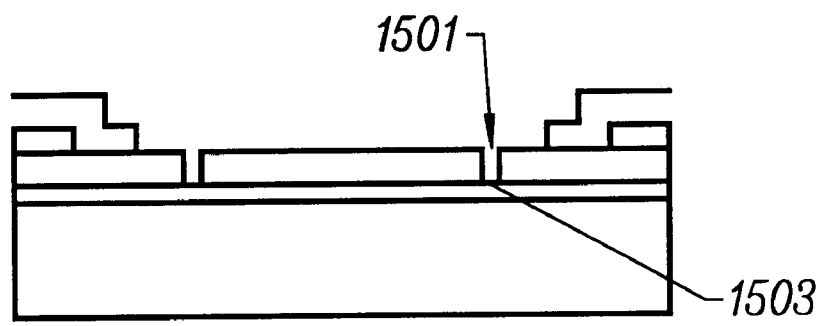
Figure 16:
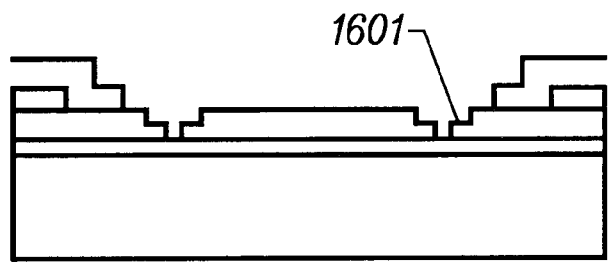

In a specific embodiment, the method uses multiple masking and etching processes to define mirror devices and torsion bar structures. Other elements may also be defined during one or more of these processes. The method forms a first mask layer overlying a surface of the substrate to define a mirror structure, as shown in FIG. 15. The method uses conventional masking and etching processes to form openings 1501 to define regions for the mirror device and torsion bar. An etching step is used to remove the silicon material to form the openings, which extend down to the insulating layer 1503. Next, the photomask is stripped.

The method then forms a second mask layer relative to exposed insulating layer to define torsion bar structures. The second mask layer exposes a portion 1601 of the substrate to define a recessed region that does not extend all the way down to the insulating layer. Here, an etching process is often used. The etching process can use any suitable chemistry for removing the silicon on the substrate. Here, etching can be performed using a wet etching process and/or dry etching process. Preferably, the etching process uses a fluorine bearing species. Next, the method strips the photoresist. Alternatively, the first masking and etching step can be performed after the second masking and etching step to form the structure in FIG. 16. Here, the second masking and etching steps form the larger width openings 1601, which do not extend along the entire thickness of the silicon material. The first masking and etching steps form a narrower recessed region 1501, which extends to the insulating layer. The recessed region has a bottom region 1503, which is defined on or near the insulating layer. One of ordinary skill in the art would recognize other modifications, alternatives, and variations to such masking and etching processes.

Figure 17:
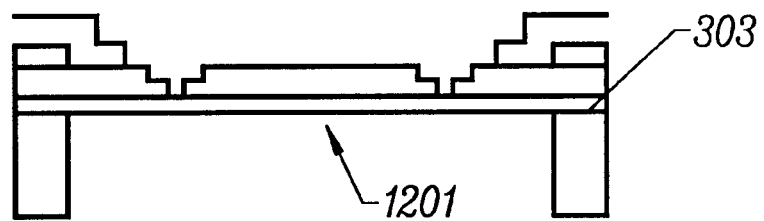
Figure 18:
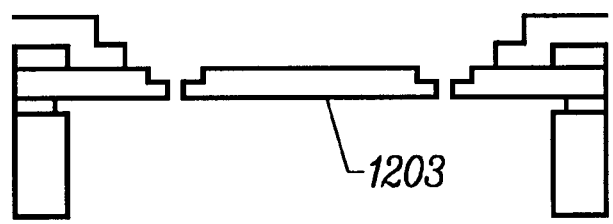

The method then patterns the backside of the substrate to define the mirror from the backside, as shown in FIG. 17. An etching step is performed to remove silicon material from the backside of the substrate. An opening 1201 is provided on the backside to remove the silicon substrate material. Preferably, the method uses an etching process such as deep reactive ion etching or the like to remove the substrate material from the backside. Such etching step removes the silicon all the way to the insulating layer 303, as shown. Next, the method performs a selective etching process to remove insulating material 303, which is still adhering to the backside of the mirror device and torsion bars. The selective etching process often uses a wet etching chemical such as a fluorine bearing species but can also be a dry etching process, e.g., plasma etching. The method completely removes 1203 the insulating layer to release the mirror devices and torsion bars from the insulating layer, as shown in FIG. 18.

The method then coats the surfaces of the mirror device to form desirable optical properties. For example, the method can sputter a material such as gold, a gold alloy, chrome, a titanium alloy, or the like onto surfaces of the substrate. In a specific embodiment, the method includes forming a reflective surface on the backside of the mirror device and further includes forming a reflective surface on a front side of the mirror device to balance mechanical stress between the front side and the backside to reduce a possibility of warp age on surfaces of the mirror device. Depending upon the embodiment, the method can also perform other steps, which are before, after, or in between any of the steps described above. Alternatively, the method can remove some of the steps above, as well as combine them to make them more integrated. Additionally, some of the steps can be expanded. It is also understood that the examples and embodiments described herein are for illustrative purposes only and that various modifications or changes in light thereof will be suggested to persons skilled in the art and are to be included within the spirit and purview of this application and scope of the appended claims.

One of ordinary skill in the art would recognize many other variations, modifications, and alternatives. The above example is merely an illustration, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for fabricating a mirror array from a silicon on insulator substrate structure, the method comprising:

providing a silicon-on-insulator (SOI) substrate structure, the SOI having a material thickness of greater than 10 microns overlying an insulating layer, the SOI material thickness being of a single crystal silicon bearing material;

patterning the material thickness using a deep reactive ion etching process to pattern a mirror device structure by forming a trench region that extends from a surface of the material thickness to the insulator structure;

patterning the thickness of material to form a recessed region coupled to the trench region to define a torsion bar structure, the recessed region extending from the surface of the material thickness toward the insulator structure and has a depth greater than about 20% of the mirror device thickness;

forming an opening on a back side of the SOI substrate structure to the insulator structure; and removing the insulator material to release the mirror device structure and the torsion bar structure.

2. The method of claim 1 wherein the deep reactive ion etching process using a fluorine bearing species.

3. The method of claim 1 wherein the deep reactive ion etching process.

4. The method of claim 1 wherein the removing step using a selective etching process, the selective etching process being selected from wet etching or plasma etching.

5. The method of claim 1 wherein the forming the opening on the back side of the SOI uses a deep reactive ion etching process that forms the opening of at least 200 microns and greater from a backside surface of the mirror device to a surface of the backside of the substrate.

6. The method of claim 1 wherein the insulator provides a buried etch stop layer.

7. The method of claim 1 wherein the insulator provides an electrical insulation between the mirror device and a remaining portion of the substrate structure.

8. The method of claim 1 further comprising forming a reflective surface on a front side of the mirror device.

9. The method of claim 1 further comprising forming a reflective surface on the backside of the mirror device.

10. The method of claim 1 wherein the reflective surface is selected from titanium, gold, a combination of gold and titanium, and chrome.

11. The method of claim 1 further comprising forming a reflective surface on the backside of the mirror device and further comprising forming a reflective surface on a front side of the mirror device to balance mechanical stress between the front side and the backside to reduce a possibility of warp age on surfaces of the mirror device.

* * * * *